US005975707A

United States Patent [19]

Kato

[11] Patent Number: 5,975,707

[45] **Date of Patent: *Nov. 2, 1999**

[54] UNDER VIEW MIRROR APPARATUS FOR A VEHICLE

[75] Inventor: Naoteru Kato, Hamamatsu, Japan

[73] Assignee: Aisin Seiki Kabushiki Kaisha, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,247

[22] Filed: Nov. 27, 1996

[30] Foreign Application Priority Data

| | | | |
|---|---|---|---|
| Nov. 30, 1995 | [JP] | Japan | 7-313125 |
| Nov. 30, 1995 | [JP] | Japan | 7-313126 |

[51] Int. Cl.[6] ..... G02B 5/08; G02B 7/18

[52] U.S. Cl. ..... 359/841; 359/514; 248/488

[58] Field of Search ..... 359/841, 844, 359/872, 507, 513, 514, 849, 871; 248/468, 475.1, 488

[56] References Cited

U.S. PATENT DOCUMENTS

| | | | |
|---|---|---|---|
| 2,722,160 | 11/1955 | Prutzman | 359/512 |
| 3,229,581 | 1/1966 | Walter | 359/872 |
| 3,337,285 | 8/1967 | Travis | 359/514 |
| 3,633,300 | 1/1972 | Poizner | 248/474 |
| 3,802,766 | 4/1974 | Magi | 359/871 |
| 4,013,351 | 3/1977 | Haile | 359/872 |
| 4,344,672 | 8/1982 | Bleiweiss et al. | 359/871 |
| 5,337,190 | 8/1994 | Kogita et al. | 359/877 |
| 5,497,273 | 3/1996 | Kogita et al. | 359/843 |
| 5,537,263 | 7/1996 | Kogita et al. | 359/841 |

FOREIGN PATENT DOCUMENTS

| | | |
|---|---|---|
| 19 54 762 | 12/1966 | Germany . |
| 69 01 458 | 1/1969 | Germany . |
| 5-24603 | 6/1993 | Japan . |
| 6-72249 | 3/1994 | Japan . |

*Primary Examiner*—Cassandra Spyrou
*Assistant Examiner*—Mark A. Robinson
*Attorney, Agent, or Firm*—Burns, Doane, Swecker & Mathis, LLP

[57] ABSTRACT

An under view mirror apparatus includes a housing having an opening and a holding rib extending toward the opening and a frame fixed to the housing at the opening in the housing. The frame is provided with an opening and a projecting portion extending along the periphery of the opening in the frame. A holding clip extends from the frame. A mirror is mounted in the opening in the frame and is held against the projecting portion of the frame by the holding clip and the holding rib.

22 Claims, 6 Drawing Sheets

2 22a 51 24 5 32 32a 52 35 36 37 21 23 31 34 33a 33 22 32b 3

1
2
1a
IV
3
32
32a
III
III
A
22a
IV
22

1
2
4
32
3
23
32a
22a
B
4
32
1a 2
21
23
24
51
5
52
3
31
32a
33a
33
32
32b
22a
22
24
VI 32
5
VII
51
33
35
34
34
33a
35
3

UNDER VIEW MIRROR APPARATUS FOR A VEHICLE

FIELD OF THE INVENTION

The present invention generally relates to a mirror apparatus, and more particularly to an under view mirror apparatus for a vehicle.

BACKGROUND OF THE INVENTION

A conventional mirror apparatus is disclosed in Japanese Utility Model Laid-Open Publication No. Hei 5-24603. This mirror apparatus comprises a housing having an exterior design portion, a frame fixed to the housing and provided with an opening, and a mirror disposed in the opening of the frame. In this conventional mirror apparatus, the mirror is supported between the edge of the opening and holding ribs formed in the housing.

The length of the ribs formed in the housing is restricted when the strength of the ribs is considered. Therefore the shape of the exterior design portion of the housing is restricted by the length of the holding ribs. This means that freedom with respect to exterior design is affected especially when the exterior design portion of the housing becomes a part of the exterior design portion of a deflector structure.

An under view mirror apparatus is disclosed in Japanese Patent Application Laid-Open Publication No. Hei 6-72249. This under view mirror apparatus includes a deflector structure located at the rear of a vehicle, a mirror structure which can assume an unused state in which the mirror structure is retracted in the deflector structure and a used state in which the mirror structure sticks out of the deflector structure, and a sealing member disposed between the deflector structure and the mirror structure which touches the deflector structure and the mirror structure.

The mirror structure identified by a housing having an exterior design portion, a frame fixed to the housing and provided with an opening, and a mirror disposed in the opening of the frame.

The sealing member of this conventional under view mirror apparatus seals the space between the deflector structure and the mirror structure and defines the position of the mirror structure relative to the deflector structure. A flat attach portion is formed at the contact portion of the sealing member, with the contact portion touching the deflector structure and the mirror structure. The sealing member is attached along the edge of the mirror structure by the flat attach portion.

However, in this under view mirror apparatus, it is necessary to cut the sealing member into several segments in order to attach the sealing member along the edge of the mirror structure.

SUMMARY OF THE INVENTION

A need exists, therefore, for an under view mirror apparatus for a vehicle which addresses at least the forgoing drawbacks of the prior art.

According to one aspect of the present invention, an under view mirror apparatus includes a housing having an opening and a holding rib extending toward the opening, and a frame fixed to the opening of the housing. The frame has a projecting portion and a holding clip. A mirror is disposed in the frame and is held against the projecting portion of the frame by the holding clip and the holding rib.

According to another aspect of the invention, an under view mirror apparatus for a vehicle includes a housing member provided with an opening along one side and at least one holding rib that extends towards the opening in the housing member. The housing member also includes at least one holding clip and the periphery of the opening in the housing member is provided with a step portion. A mirror is mounted on the holding member and is held against the step portion of the housing member by the holding clip and the holding rib.

According to a still further aspect of the invention, an under view mirror apparatus for a vehicle includes a housing having provided with an opening, a frame fixed to the housing at the opening, a mirror mounted on the frame at an opening in the frame, and a seal member secured to either the frame or the housing. The seal member is disposed between the peripheral edge of the frame and the edge of the opening in the housing.

BRIEF DESCRIPTION OF THE DRAWING FIGURES

The foregoing and additional features of the present invention will become more apparent from the following detailed description of a preferred embodiment when considered with reference to the attached drawing figures in which like elements are designated by like reference numerals and wherein.

DESCRIPTION OF THE PREFERRED EMBODIMENT

Figure 1:
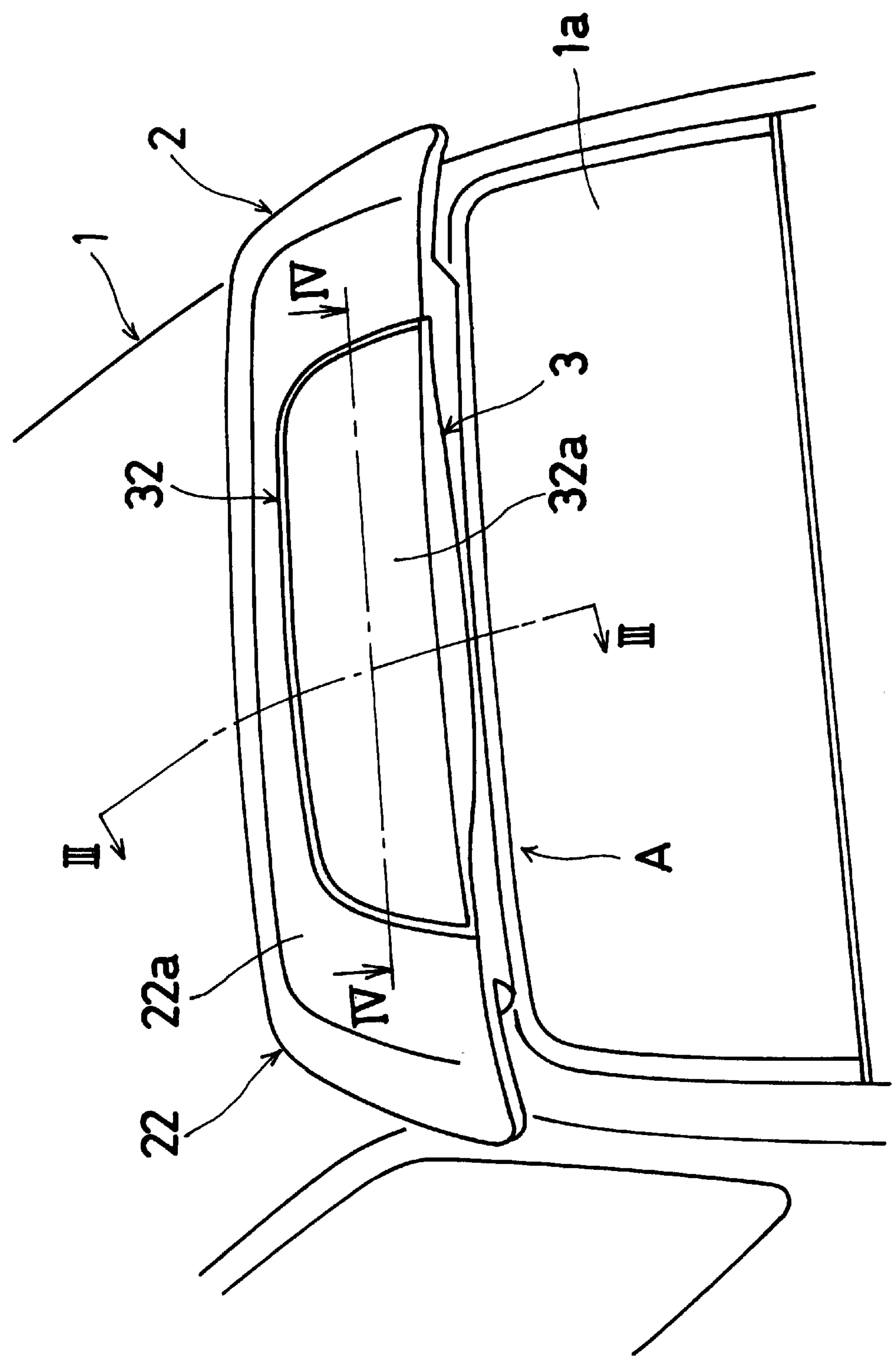
FIG. 1 is a perspective view of a rear of a vehicle illustrating the under view mirror apparatus according to the present invention in the retracted or non-use state.
Figure 2:
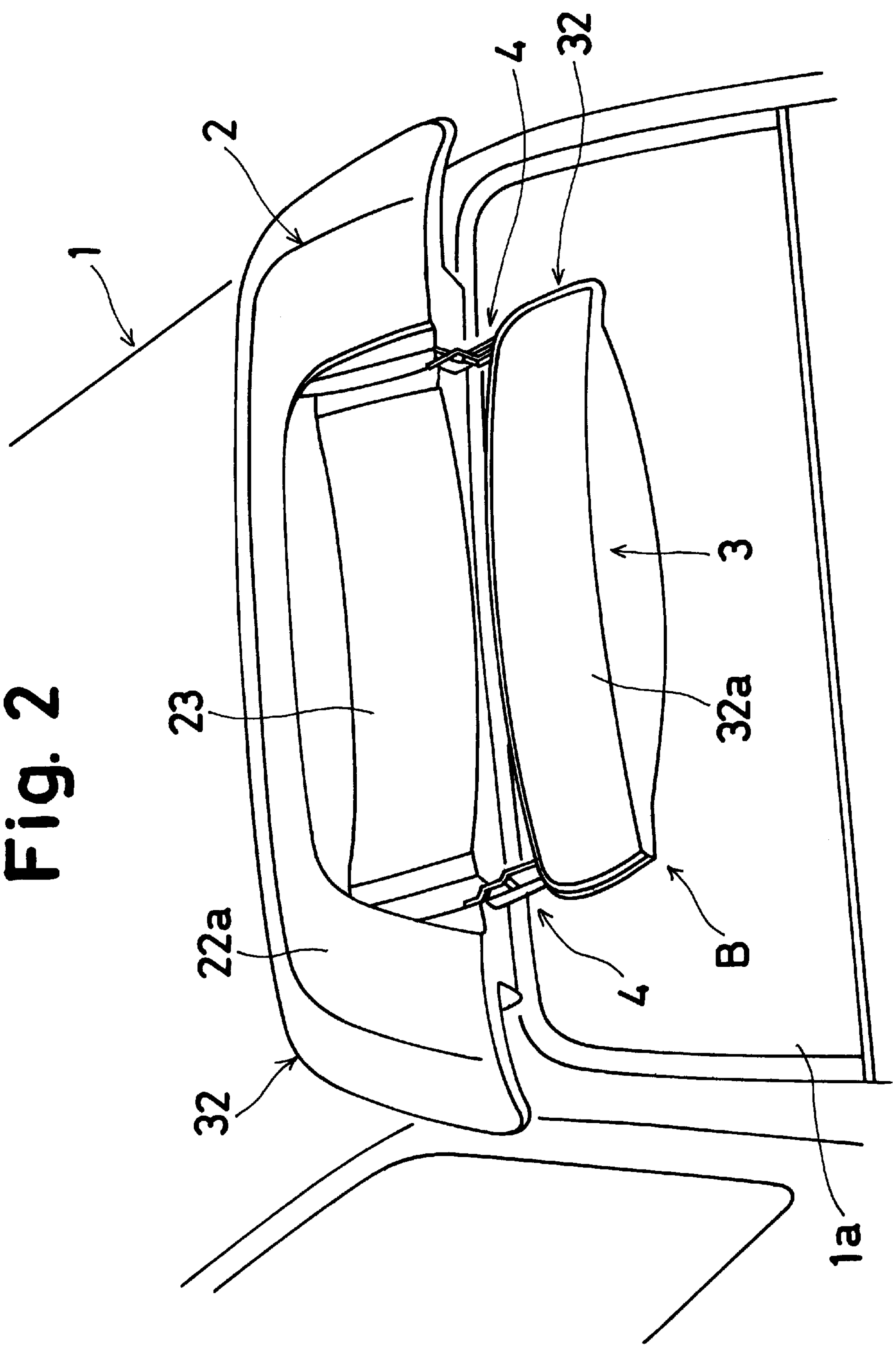
FIG. 2 is a perspective view of the rear of the vehicle illustrating the under view mirror apparatus of the present invention in the extended or use state.

As illustrated FIGS. 1 and 2, a deflector 2 is mounted on the rear portion of a vehicle, particularly the portion of the vehicle located above the rear windshield 1*a*. The deflector 2 controls the air stream generated by the movement of the vehicle 1 to decrease air resistance or to clean the rear windshield 1*a* by blowing wind on the rear windshield. A movable member 3 is movably supported on the deflector 2 by way of a conventional move mechanism 4 that is generally depicted in FIG. 2. With the help of the move mechanism 4, the movable member 3 moves between the non-use or stored state A shown in FIG. 1 in which the movable member 3 is retracted or stored in the deflector 2 in a retracted position and the use state B shown in FIG. 2 in which the movable member extends out from the deflector 2 in an extended position.

As illustrated in FIGS. 1–4, the deflector 2 includes an attach side member 21 which is attached to the vehicle 1 and an exterior side member 22 which forms the externally appearing portion of the deflector 2. The attach side member 21 and the exterior side member 22 are bolted to each other so as to form a hollow interior. A concave portion or recess 23 is formed in the exterior portion 22*a* of the exterior side member 22 (i.e., the portion of the exterior side member 22 facing away from the vehicle). The movable member 3 is stored in the recess 23 when the movable member 3 is in the non-use state A. A flat portion 24 is formed along the topside and the opposite lateral sides of the concave portion or recess 23 and continuously extends from the concave portion 23 to the exterior design portion 22*a*.

Figure 3:
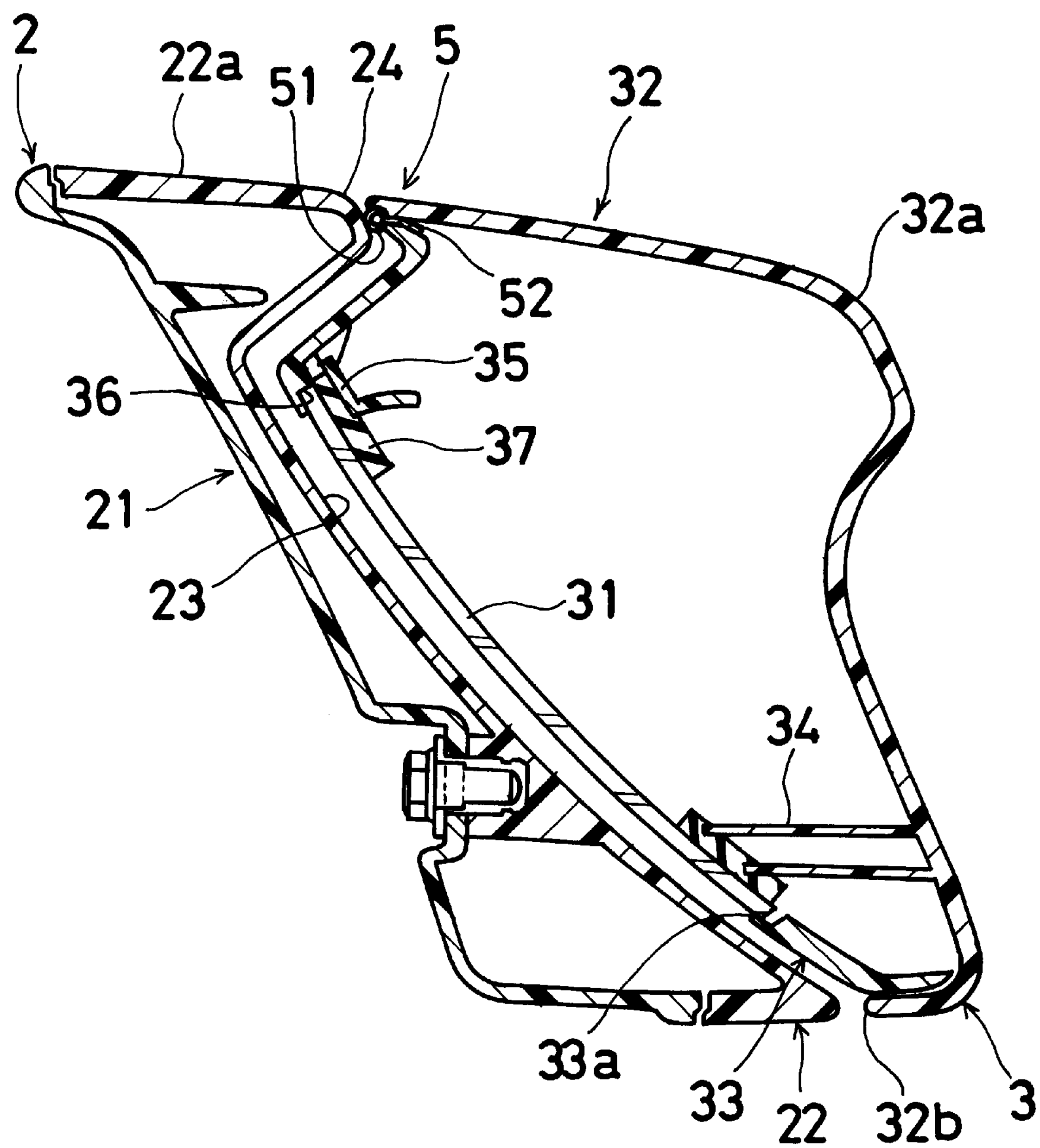
FIG. 3 is a cross-sectional view taken along the section line III—III in FIG. 1.
Figure 4:
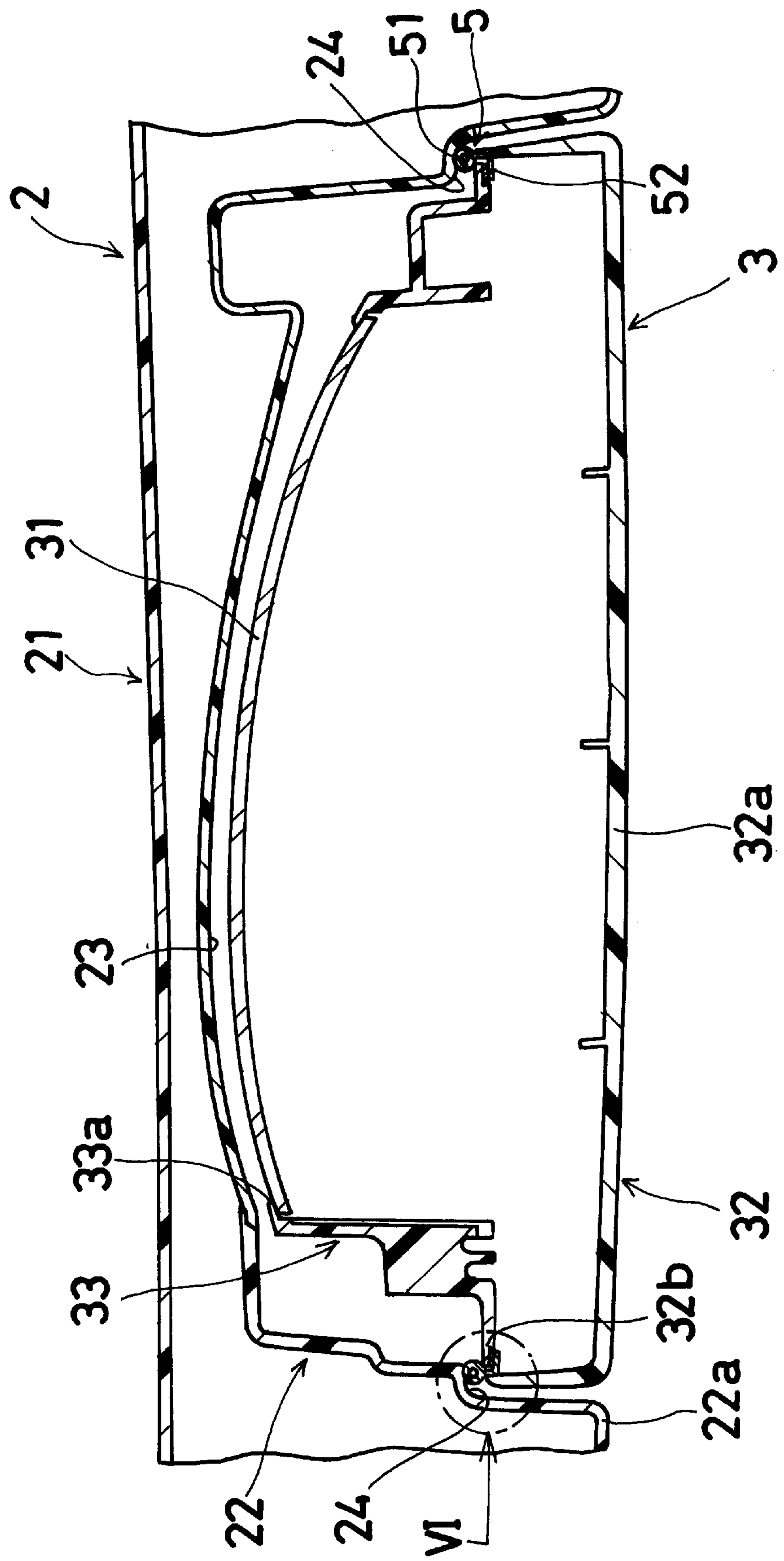
FIG. 4 is a cross-sectional view taken along the section line IV—IV in FIG. 1.

As shown in FIGS. 1–5, the movable member 3 includes a mirror 31, a housing 32, and a frame 33. The housing 32 possesses a box-like shape to form an opening 32*b*. The housing 32 also includes an exterior design portion 32*a* that forms the exterior appearance portion of the housing 32 when the movable member is housed within the recess 23 in the deflector 2. As seen with reference to FIG. 4, the exterior design portion 32*a* of the housing 32 is generally aligned with the exterior design portion 22*a* of the exterior side member 22 of the deflector 2 when the movable member 3 is in the non-use state A. The housing 3 and the exterior side member 22 thus constitute the external appearance of the deflector 2 together as shown in FIGS. 1 and 4.

The frame 33 is disposed to cover the opening 32*b* in the housing 32 and is bolted to the housing 32. An opening 33*a* is formed in the frame 33, and the mirror 31 is disposed in the frame 33 so as to cover the opening 33*a* in the frame 33. The housing 32 and the frame together define a housing member. The mirror 31 is supported within the frame 33 or the housing member in the manner described below in more detail.

Figure 5:
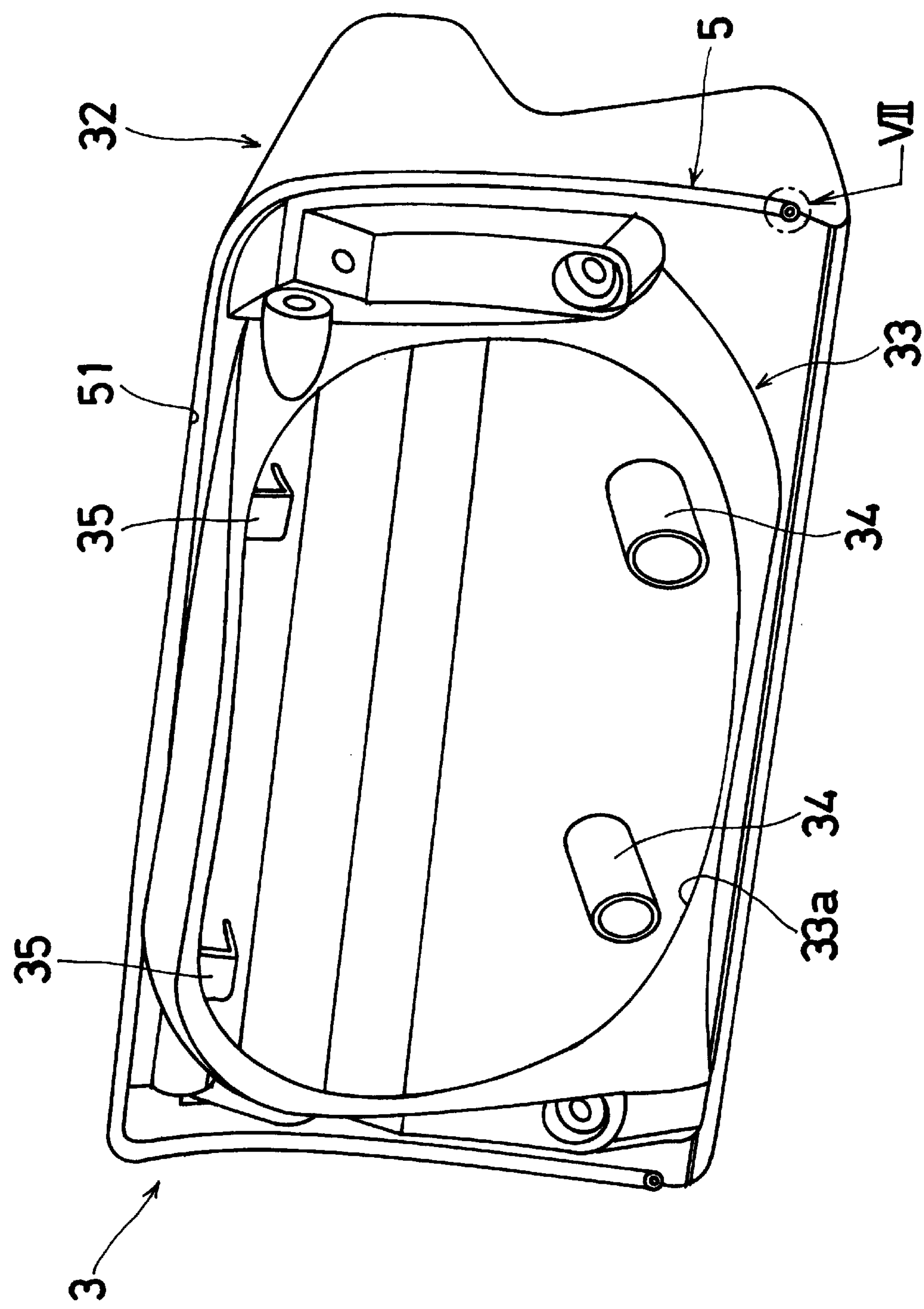
FIG. 5 is a perspective view of the under view mirror apparatus according to the present invention.

As depicted in FIGS. 3 and 5, several holding ribs 34, that can be generally cylindrical in shape, are formed on the inside surface of the exterior design portion 32*a* of the housing 32. The holding ribs 34 protrude towards the opening 33*a* in the frame 33. Connected to and located inside the frame 33 are several generally L-shaped holding clips 35 that are disposed substantially in parallel with the opening 33*a* in the frame 33 as seen in FIG. 3. A radially inwardly directed step or projecting portion 36 is formed along the periphery of the opening 33*a* of the frame 33.

The mirror 31 is mounted in the frame 33 such that the peripheral edge of the mirror 31 is located on the step portion 36. The mirror 31 is held in place by the holding clips 35 and the holding ribs 34. In this regard, an elastic member or elastic members 37 are attached to the back surface of the mirror 31 so that the holding clips 35 and the holding ribs 34 bear against the elastic member(s) 37. With this construction, the mirror 32 is sandwiched between the frame 33 and the housing 32 along its peripheral edge.

With reference to FIGS. 3–5, an elastic sealing member 5 is disposed along the topside and the opposite lateral sides of the frame 33. The elastic member 5 is comprised of a contact portion 51 having a circular cross-sectional shape and an elongated generally flat attach portion 52 extending from the contact portion 51. The elongated attach portion 52 extends generally radially outwardly from the outer peripheral surface of the hollow contact portion 51. The contact portion 51 and the attach portion 52 are formed unitarily as a single one-piece body.

Figure 6:
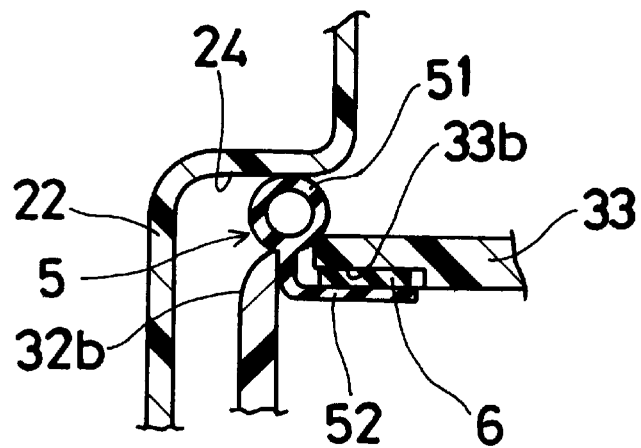
FIG. 6 is a enlarged view of the position of the under view mirror apparatus identified by the detail VI in FIG. 4.

As seen in FIG. 6, a step portion 33*b* is formed along the topside and the opposite lateral sides of the frame 33 of the movable member 3. The attach portion 52 of the elastic member 5 is attached to the step portion 33*b* at the inside surface of the frame 33 that faces towards the interior of the housing and frame. The attach portion 52 of the elastic member 5 is preferably attached to the step portion 33*b* by being glued with an adhesive 6.

The attach portion 52 of the elastic member 5 is sandwiched between the edge surface of the frame 33 and the inside surface along the edge of the opening 32*b* of the housing 32. With the elastic member 5 attached along the edge of the movable member 3, the contact portion 51 is twisted so that the attach portion 52 may be sandwiched between the edge surface of the frame 33 and the inside surface along the edge of the opening 32*b* of the housing 32 at any portion of the edge of the movable member 3.

The contact portion 51 of the elastic member 5 touches or contacts the flat portion 24 of the deflector 2 as well as the edge of the movable member 3 and thus seals the space between the movable member 3 and the deflector 2 to provide a water tight fit between the movable member 3 and the deflector 2. The elastic member 5 also defines the stop position of the movable member 3 against deflector 2 so that when the movable member 3 is in the stored position A shown in FIG. 1, the exterior design portion 32*a* of the housing 32 of the movable member 3 and the exterior design portion 22*a* of the exterior side member 22 of the deflector 2 appear as a generally continuous surface (i.e., they are generally planar). In short, the elastic member 5 functions as both a seal and a stopper between the movable member 3 and the deflector 2.

Figure 7:
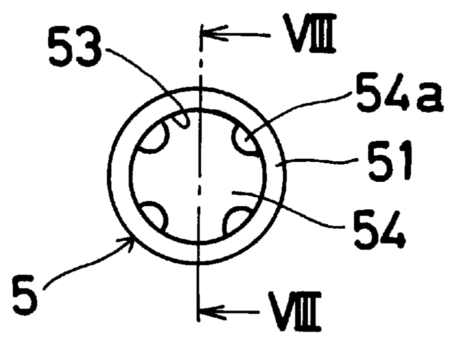
FIG. 7 is a enlarged view of the position of the under view mirror apparatus identified by the detail VII in FIG. 5.
Figure 8:
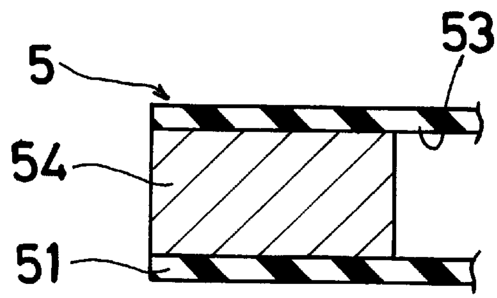
FIG. 8 is a cross-sectional view taken along the section line VIII—VIII in FIG. 7.

As depicted in FIGS. 7 and 8, the contact portion 51 of the elastic member 5 possesses a hollow interior 53 and is provided with a stopper 54 positioned in the hollow interior to stuff up or close off the hollow interior 53 of the elastic member 53 at both ends of the contact portion 51 of the elastic member 5. The stopper 54 can be made of rigid material. The stopper 54 also serves to improve the stopper function of the elastic member 5 at specified locations of the stopper. That is the stopper 54 tends to make the ends of the contact portion 51 a bit more rigid (i.e., less resilient) than other portions of the contact portion 51 so that such portions of the contact portion 51 are better able to stop the movement of the movable member 3 as the movable member 3 moves to the unused or retracted state shown in FIG. 1.

Ventilators or vent spaces 54*a* are also formed in the stopper 54 to vent the hollow interior 53 of the contact portion 51 and thereby prevent the stopper 54 from being forced out of the hollow interior due to internal pressure in the hollow interior 53. It is possible to fix the stopper 54 within the hollow interior 53 of the contact portion 51 by an engagement means such as glue or the like. It is also possible to do away with the ventilators 54*a* and replace them with foam members having many small holes.

By virtue of the mirror assembly of the present invention, the shape of the exterior appearance portion of the housing is not restricted by the holding ribs. Additionally, the mirror assembly of the present invention is quite advantageous in that it does not require that the sealing member be cut up into several pieces.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle under view mirror apparatus having an upper portion and a lower portion comprising;

a housing having an opening and a holding rib extending toward the opening;

a frame fixed to the housing at the opening, the frame having an opening and a projecting portion formed along a periphery of the opening in the frame, the frame including a holding clip; and a mirror mounted in the opening of the frame, the mirror being held against the projecting portion of the frame by the holding clip at the upper portion of the under view mirror apparatus and being held against the projecting portion of the frame by the holding rib at the lower portion of the under view mirror apparatus.

2. An under view mirror apparatus as claimed in claim 1, further comprising a deflector structure for being mounted at a rear portion of a vehicle, the deflector structure supporting the housing, the frame and the mirror.

3. An under view mirror apparatus as claimed in claim 2, further comprising a seal member disposed between the frame and the deflector structure.

4. An under view mirror apparatus as claimed in claim 3, wherein the seal member includes a hollow contact portion and an elongated attach portion extending from the hollow contact portion, the attach portion being sandwiched between the housing and the frame.

5. An under view mirror apparatus as claimed in claim 4, further comprising a rigid member placed in the hollow contact portion of the seal member.

6. An under view mirror apparatus as claimed in claim 5, wherein the rigid member is disposed along only end portions of the contact portion of the seal member.

7. An under view mirror apparatus as claimed in claim 2, wherein the deflector structure is provided with a recess for receiving the housing, the housing having an outer surface that forms a part of an externally appearing surface of the deflector structure when the housing is accommodated in the recess in the deflector structure.

8. An under view mirror apparatus as claimed in claim 1, wherein the housing, the frame and the mirror together define a movable member, and including a deflector provided with a recess, said movable member being mounted on the deflector by way of a move mechanism for movement between a stored position in which the movable member is positioned in the recess in the deflector and an extended position in which the movable member extends out from the recess in the deflector.

9. An under view mirror apparatus as claimed in claim 1, wherein the projecting portion of the frame defines a step, the mirror being held in place on the housing member by being sandwiched between the holding rib and the step and between the holding clip and the step.

10. An under view mirror apparatus for a vehicle comprising:

a housing member that includes a housing and a frame, the frame being a part that is separate from the housing and connected to the housing, the frame being provided with an opening along one side, the housing being provided with at least one holding rib that extends towards the opening in the housing, the frame including at least one holding clip, the opening having a periphery and the frame being provided with a step portion that is formed along the periphery of the opening in the frame; and a mirror mounted on the frame, the mirror being held in place on the frame by being sandwiched between the holding rib and the step portion and between the holding clip and the step portion.

11. An under view mirror apparatus as claimed in claim 10, wherein the housing includes a hollow interior, the mirror having a back surface facing towards the hollow interior of the housing, and including an elastic member secured to the back surface of the mirror member, the holding clip and the holding rib engaging the elastic member.

12. An under view mirror apparatus as claimed in claim 10, including a seal member secured to the frame.

13. An under view mirror apparatus as claimed in claim 12, wherein the seal member includes a hollow contact portion and an elongated attach portion extending from the hollow contact portion.

14. An under view mirror apparatus as claimed in claim 13, including a rigid member placed in the hollow contact portion of the seal member.

15. An under view mirror apparatus for a vehicle comprising:

a housing provided with an opening, the housing including a holding rib extending toward the opening in the housing;

a frame fixed to the housing at the opening, the frame having an opening and including a holding clip;

a mirror mounted on the frame at the opening in the frame, the mirror being held against the frame by the holding clip and the holding rib; and a seal member secured to one of the frame and the housing, the seal member being disposed between a peripheral edge of the frame and an edge of the opening in the housing.

16. An under view mirror apparatus as claimed in claim 15, wherein the seal member includes a hollow contact portion and an elongated attach portion extending from the hollow contact portion.

17. An under view mirror apparatus as claimed in claim 16, including a rigid member placed in the hollow contact portion of the seal member.

18. An under view mirror apparatus as claimed in claim 16, wherein the elongated attach portion is secured to the frame.

19. An under view mirror apparatus as claimed in claim 15, wherein the housing and the frame define an interior, the frame including an inside surface facing the interior, the seal member being secured to the inside surface of the frame.

20. An under view mirror apparatus as claimed in claim 15, wherein the seal member includes a hollow contact portion and an elongated attach portion extending from the hollow contact portion, the elongated attach portion being sandwiched between the peripheral edge of the frame and the edge of the opening in the housing.

21. An under view mirror apparatus for a vehicle comprising:

a housing provided with an opening;

a frame fixed to the housing at the opening, the frame having an opening;

a mirror mounted on the frame at the opening in the frame;

a seal member secured to one of the frame and the housing, the seal member being disposed between a peripheral edge of the frame and an edge of the opening in the housing, the housing, the frame and the mirror together defining a movable member, and including a deflector provided with a recess, said movable member being mounted on the deflector by way of a move mechanism for movement between a stored position in which the movable member is positioned in the recess in the deflector and an extended position in which the movable member extends out from the recess in the deflector.

22. An under view mirror apparatus as claimed in claim 21, wherein the seal member includes a hollow contact portion and an elongated attach portion extending from the hollow contact portion, the hollow contact portion being positioned between the movable member and the deflector when the movable member is in the stored position.

* * * * *